United States Patent

[11] 3,595,146

| [72] | Inventor | Quentin S. Johnson<br>Fairfax, Va. |
|---|---|---|
| [21] | Appl. No. | 798,999 |
| [22] | Filed | Feb. 13, 1969 |
| [45] | Patented | July 27, 1971 |
| [73] | Assignee | Singer-General Precision, Inc. |

[54] CAMERA
6 Claims, 1 Drawing Fig.

[52] U.S. Cl. ................................................ 95/1, 250/71
[51] Int. Cl. ........................................... G03b 17/00
[50] Field of Search ............................... 95/1; 355/3; 250/71, 213, 214, 227

[56] References Cited
UNITED STATES PATENTS

| 2,281,638 | 5/1942 | Sukugmlym | 355/3 |
| 2,586,392 | 2/1952 | Sheldon | 250/71 X |
| 2,739,257 | 3/1956 | Sheldon | 250/71 X |
| 2,790,085 | 4/1957 | Fransen | 250/71 X |
| 2,834,889 | 5/1958 | Fries | 355/3 X |
| 2,883,543 | 4/1959 | Wohl | 355/3 X |
| 2,976,447 | 3/1961 | McNaney | 96/(UX) |
| 3,208,363 | 9/1965 | Easterly | 352/72 X |
| 3,235,658 | 2/1966 | Levy | 96/1 X |
| 3,345,531 | 10/1967 | Sheldon | 250/71 X |
| 3,430,053 | 2/1969 | Westhauer | 250/214 |
| 3,462,601 | 8/1969 | Sternglass | 250/213 X |
| 3,486,821 | 12/1969 | Westhauer | 250/214 X |

*Primary Examiner*—Samuel S. Matthews
*Assistant Examiner*—Monroe H. Hayes
*Attorneys*—Joseph R. Dwyer and Linval B. Castle

ABSTRACT: A high speed camera having a gated image intensifier tube in the optical path and having automatic exposure controls for gating the image tube according to the lighting conditions sensed by a photomultiplier tube which shares the optical image with the image tube. The image intensifier may amplify the image by a factor of 50,000 or more so that fast exposures may be made of extremely low-illuminated objects.

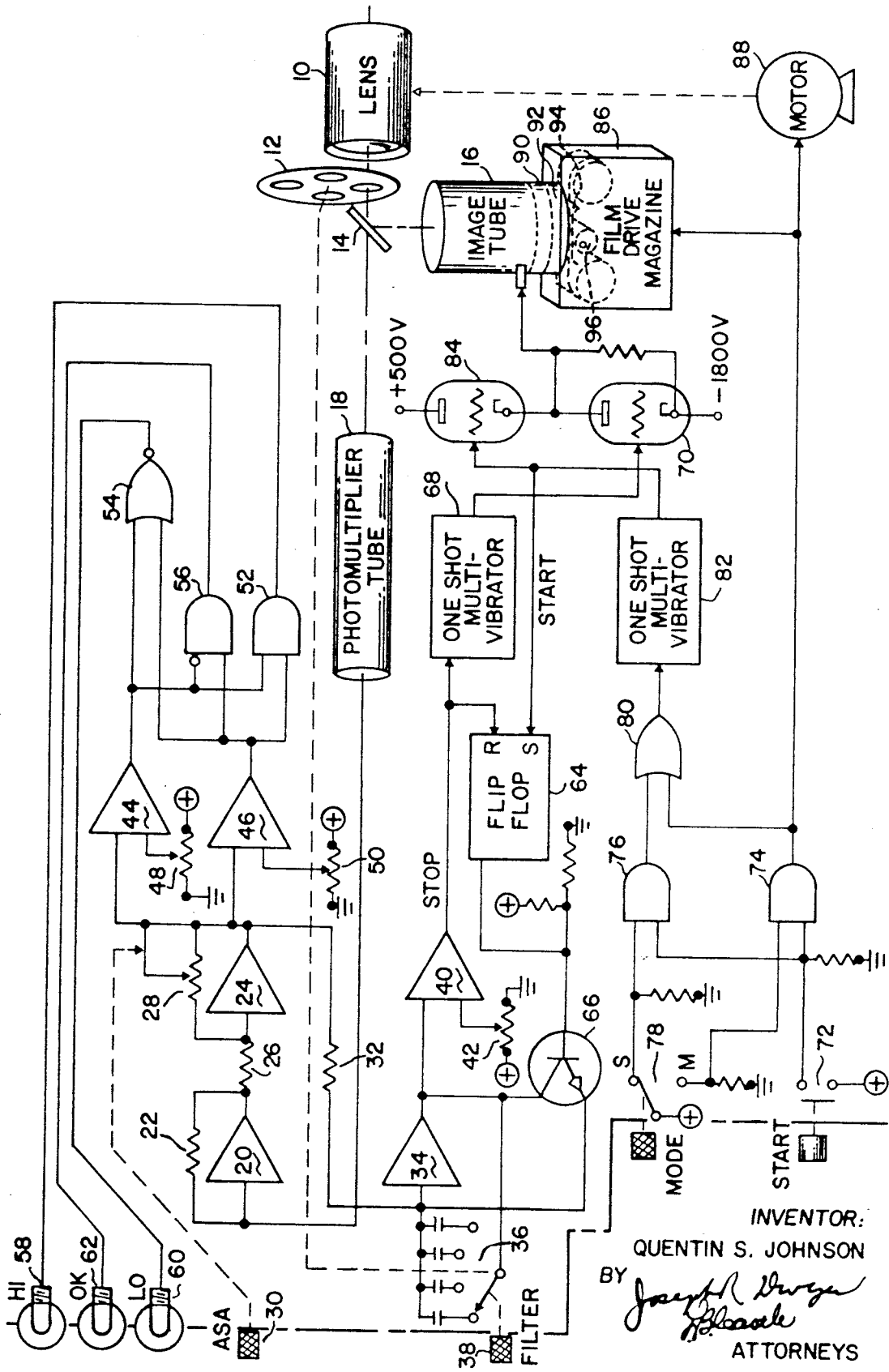

CAMERA

BACKGROUND OF THE INVENTION

This invention relates particularly to cameras adapted for making very high speed exposures having durations as low as 5 to 10 microseconds. The usual high speed cameras are incapable of such very short exposure times and therefore must rely upon extremely fast photographic film and very high scene illuminations for their operation. The camera to be described herein, by the use of an electronically gated image intensifier tube, will properly expose a commercially available film of normal film speed, in the high speed photography of poorly illuminated objects.

Briefly described, the camera includes a photographic objective lens system which directs the image through a beam splitter to a gated image intensifier tube and also to a photomultiplier tube. The gated image intensifier tube is coupled through fiber optics to the film in a motorized film drive magazine, and the photomultiplier tube is coupled through suitable amplifiers to an integrating circuit which integrates the photomultiplier tube signal to a predetermined threshold level, at which level a signal is generated which gates off the image tube. Focusing of the lens system may be accomplished either manually during visual inspection of the image in the phosphor of the intensifier tube or automatically by the use of a lens cycling motor that causes the lens to sweep through approximately 20 different focus positions per second while a corresponding number of exposures are being made. The camera may be used to take single exposures or the motorized film drive magazine may be continuously operated to produce motion pictures. Because the image intensifier tube makes extremely short exposures with normal lighting, the image smear is minimal and the camera is well suited for low level aerial photography or other applications where the camera bed may be moving. Thus, because of the extremely fast exposure time, the camera does not require complex and expensive image motion correction devices such as are necessary in conventional cameras.

DESCRIPTION OF THE DRAWINGS

The single figure is a block diagram of one preferred embodiment of the high speed camera.

DETAILED DESCRIPTION

The high speed camera illustrated in the block diagram comprises an objective lens 10 which directs its image through one of a plurality of neutral density filters mounted on a rotatable filter disc 12. Upon passing through filter disc 12, the image is divided by a partially silvered beam splitter 14 so that a major portion is reflected into the input screen of a gated image intensifier tube 16. Such tubes are commercially available and an image intensifier tube particularly suitable for use in the camera is an especially modified version of commercial type ML-8606 which is available from the RCA Electron Tube Division in Lancaster, Pennsylvania. Other manufactures can produce suitably gated image intensifier tubes by the addition of gating circuits to commercial tubes currently being produced under the military designation of MX-7856-UV. These and more advanced types of image intensifier tubes are devices having suitable image amplifications of up to 50,000X. Any suitable image intensifier tube can be gated by the addition of a switching circuit providing two different voltage levels. Typically the image intensifier tube is cut off by the application of approximately −1800 volts to the gate terminal, and the image is multiplied by the application of a positive focus voltage to the gate terminal.

In the embodiment shown in the figure, the portion of the image passing through rotatable filter disc 12 and beam splitter 14 enters photomultiplier tube 18 which produces at its output an electrical current proportional to the amount of light received at its input. To convert this current into a usable voltage signal, the output of the photomultiplier tube 18 is coupled to the input of an amplifier 20 where the signal is amplified and converted to a voltage output that is proportional to the product of the current from photomultiplier tube 18 and the resistance of feedback resistor 22. The output of amplifier 20 is coupled to the input of amplifier 24 through a series resistance 26. Amplifier 24 is provided with a variable feedback resistance 28 so that the amplification of amplifier 24 is proportional to the value of feedback resistance 28 divided by the value of series resistance 26. Variable feedback resistance 28 is mechanically coupled to a control knob 30 on the outside of the camera housing and may be calibrated in ASA numbers to provide film speed compensation to the circuitry.

The output of film speed compensation amplifier 24 is coupled through a resistance 32 into a voltage integrating circuit comprising an amplifier 34 which is shunted by a single pole four position switch 36 which, when rotated by control knob 38, selects any one of four values of capacitance. Control knob 38 not only controls switch 36, but is also mechanically coupled to the rotatable filter disc 12 located in the optical system. Therefore, selection of an appropriate neutral filter in filter disc 12 will also select an appropriate capacitance to be used in the integrating circuit. The determination of which filter and capacitance is appropriate will be explained later. The output of the integrating amplifier 34 is coupled to a threshold amplifier 40 which is provided with an additional input from a threshold control resistance 42 which supplies to amplifier 40 a predetermined reference voltage above which threshold amplifier 40 will produce an output signal. Thus, the current from photomultiplier tube 18 is converted into a corresponding voltage which, when compensated by the ASA potentiometer 28, is coupled into an integrating circuit which integrates this signal and provides an output ramp voltage to the threshold amplifier 40 which passes a signal after the ramp voltage has reached the threshold level determined by the threshold control resistance 42.

As previously explained, rotation of control knob 38 selects different capacitors for the integrating amplifier 34 and also rotates the rotatable filter disc 12 which contains a selection of neutral density filters. It is apparent that a very dense filter will produce a lower anode current from photomultiplier tube 18 and the voltage ramp produced by the integrating amplifier 34 would have a relatively shallow ramp angle. On the other hand, if a relative clear filter were selected in the filter disc 12, the photomultiplier tube 18 would produce a greater current and the integrating amplifier 34 would produce a much steeper ramp. Thus, adjustment of the control knob 38 selects a particular light level to be sensed by the photomultiplier 18 and selects a particular value of capacitance in the integrator circuit to correspond to the signal produced by that particular light level.

In order to aid the operator in selecting the appropriate light level, the signal from the film speed compensation amplifier 24 is monitored by a monitor circuit which includes threshold amplifiers 44 and 46. Threshold amplifier 44 is adjusted by a reference voltage resistance 48 to produce an output signal only if the input signal exceeds a predetermined voltage of, for example, 1.0 volts. Similarly, threshold amplifier 46 is coupled to a reference voltage resistance 50 so that amplifier 46 will only produce an output signal if its input signal exceeds a lower voltage of, for example, 0.1 volts. Coupled to the output terminals of threshold amplifiers 44 and 46 is logic circuitry which controls appropriate indicator lamps to inform the operator when he has selected the correct neutral filter in the filter disc 12. This logic circuitry comprises an AND gate 52, a NOR gate 54 and an inhibitor gate 56 which, as indicated in the diagram, is an AND gate with one input inverted. If the output voltage of the film speed compensation amplifier 24 exceeds the threshold level of both amplifiers 44 and 46, amplifiers 44 and 46 will each produce an output signal. In response to two input signals, NOR gate 54 produces no output. Inhibitor gate 56 which produces an output only when it receives an input signal from amplifier 46, but no signal from amplifier 44, will also produce no output. AND gate 52 generates an output when it receives two input signals and will, in this case, produce an output signal to lamp 58 to indicate that the photomultiplier tube 18 is generating too much current and that the operator should select a more dense filter in filter disc 12. If the operator should select too dense a filter, the photomultiplier tube current will be very low and the output voltage of amplifier 24 will be below the thresholds and will not be passed by either threshold amplifier 44 or 46. This lack of output signals from both amplifiers is sensed by NOR gate 54 which produces an output signal to lamp 60 to indicate to the operator that he has selected too dense a filter. When a proper filter has been selected and the photomultiplier tube current is within its proper operating range, threshold amplifier 44 will not produce an output signal, but threshold amplifier 46 will produce an output. Accordingly, inhibitor gate 56 will produce an output signal to lamp 62 indicating to the operator that the proper filter has been selected.

As previously explained, the output current from the photomultiplier tube 18 is converted into a ramp voltage by integrator amplifier 34 and the predetermined threshold level is detected by amplifier 40 which produces an output signal when the voltage ramp has reached that threshold. The output of threshold amplifier 40 is coupled to the reset terminal of a flip-flop 64. The output terminal of flip-flop 64 is coupled to the base of a switching transistor 66, the emitter and collector of which are connected across integrator amplifier 34. Thus, when amplifier 40 produces an output signal indicating that the ramp voltage has reached its desired threshold, flip-flop 64 is triggered to saturate transistor 66 which, in turn, discharges the integrating capacitor and shorts out integrator amplifier 34 in preparation for its next integration operation.

The output of threshold amplifier 40 is also coupled to the input of a one-shot multivibrator 68 which is designed to reset in approximately one-half microsecond. The output of multivibrator 68 is coupled to the control grid of a vacuum tube 70 which, when conducting, applies a cutoff voltage of approximately −1800 volts to the gate of image intensifier tube 16.

Image intensifier tube 16 is started by the operation of a start switch 72 which supplies an input signal to each of two two-terminal AND gates 74 and 76. AND gate 74 receives its second input signal from a mode switch 78 which selects either a single frame exposure or a multiframe exposure. When mode switch 78 is positioned in the multiframe position, M, a second input is supplied to AND gate 74. When mode switch 78 is in the single frame position, S, the second input is supplied to AND gate 76. The output terminals of AND gates 74 and 76 are connected to the input terminals of OR gate 80 which will pass either signal into a one-shot multivibrator 82, the output of which is coupled to the control grid of vacuum tube 84. When a positive voltage is applied to the control grid of tube 84, the tube becomes conductive and applies a voltage of approximately +500 volts to the gate terminal of image intensifier tube 16. The output of one-shot multivibrator 82 is also coupled to the set terminal of flip-flop 64 so that when start button 72 is actuated, a set signal at flip-flop 64 will produce an output signal that will cutoff conduction of switching transistor 66 so that the integrating circuit may begin operation.

When the multiframe mode is selected by mode switch 78, and when start switch 72 is closed, AND gate 74 will also supply a signal to film drive mechanism 86. Simultaneously, a signal may be supplied to a focus motor 88 which may be mechanically coupled to lens 10 to vary the focus of lens 10 between infinity and some predetermined closer range. Thus, upon actuation of the start button in the multiframe mode, a signal emanating from AND gate 74 will start motor 88 in its lens cycling operation and will also start the motor in film drive magazine 86 to make exposures at any predetermined rate, for example, 24 frames per second. If desired, the signal to motor 88 may be disconnected and lens 10 may be either focused manually or by a conventional coupled range finder system. In this configuration, operation of the camera in the multiframe mode will produce motion pictures at a speed determined by the operation of the film drive magazine 86.

When operated in the single frame mode, there no signals applied to film drive magazine 86 nor to lens cycling motor 88. Lens 10 will be manually focused and operation of the start switch 72 will result in only a single exposure.

Image intensifier tubes, such as the type used in this camera, employ fiber optics at the focal plane to insulate high voltages on the tube elements from metallic film holders, or magazines, at the focal plane. Unfortunately, optical fibers are relatively soft and the movement of a film across the focal plane will cause rapid wearing of the fibers and will severely limit the life of an expensive image intensifier tube. Therefore, to prevent fiber wear and shortened image tube life in the camera embodiment shown, tube 16, which contains fiber optics 90 at its focal plane is provided with an additional panel 92 of fiber optics in a removable mounting interposed between the tube fiber optics 90 and film drive magazine 86. Film movement will therefore wear the fibers of panel 92, which are readily replaced at a low cost, and the fiber optics 90 of the expensive image tube 16 will remain intact. In order to reduce the wear and to extend the life of the fiber optics in panel 92, the film drive magazine 86 is provided with a film pressure plate 94 which is actuated against the film by a cam 96 that is geared to rotate with the film takeup spool. Thus, during the actual film transport between exposures the cam-operated pressure plate 94 releases the film from contact with the fiber optics in panel 92 to minimize wear and extend the life of the fibers.

I claim:
1. A photographic camera comprising:
 a photographic objective lens system;
 an electronically gated image intensifier tube positioned in the optical path from said lens system;
 film means for positioning a photographic film at the focal plane of said tube; and
 electronic means for gating said image intensifier tube, said electronic means comprising:
  first switching means for applying a suitable voltage to the gate terminal of said tube to cause operation of said tube;
  sampling means interposed in the optical path between said lens system and said image tube for sampling the illumination of the object viewed by said lens system;
  converting means coupled to said sampling means for converting the sampled illumination into a corresponding voltage level;
  circuit means for integrating the voltage output of said converting means; and
  second switching means coupled to said circuit means and to the gate terminal of said image tube for generating a suitable quenching voltage when the integrated voltage from said circuit means reaches a predetermined level.

2. The camera claimed in claim 1 wherein said sampling means comprises a partially silvered mirror positioned at a suitable angle to the optical axis to enable a portion of the illumination to be reflected and a portion refracted through said mirror.

3. The camera claimed in claim 1 wherein said converting means comprises a photomultiplier tube for converting the sampled illumination into a corresponding current, and a feedback amplifier for converting the current into a corresponding voltage level.

4. The camera claimed in claim 1 wherein said circuit means includes a voltage integrator having a plurality of integrating capacitors of varying capacitance, and a switch for selecting one of said plurality of capacitors, said switch also being coupled to said illumination control means for selecting an appropriate one of the plurality of neutral density filters.

5. The camera claimed in claim 1 further including indicator control circuitry coupled to the output of said converting means for producing a signal when the proper filter of said illumination control means has been selected, said indicator control circuitry comprising:
- a first threshold amplifier for producing an output signal when its input signal exceeds a predetermined upper voltage level;
- a second threshold amplifier for producing an output signal when its input signal exceeds a predetermined lower voltage level; and
- logic circuitry coupled to receive the output signals of said first and second threshold amplifiers for producing an output signal when the level of the input signals to said first and said second threshold amplifiers is between the said predetermined lower and upper voltage levels.

6. The camera as claimed in claim 1 further including mode selection means coupled to said first switching means for selectively producing an electrical signal, upon actuation of said first switching means, for energizing a motor driven film drive magazine.